May 31, 1955  B. FERRARA  2,709,466
SCREW-HOLDING ATTACHMENT FOR SCREW DRIVER
Filed May 13, 1952
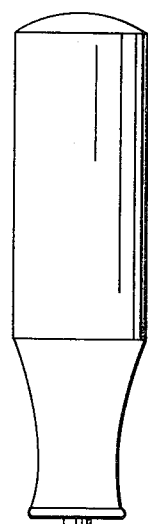
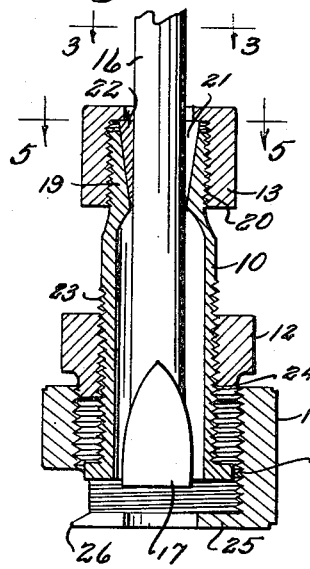
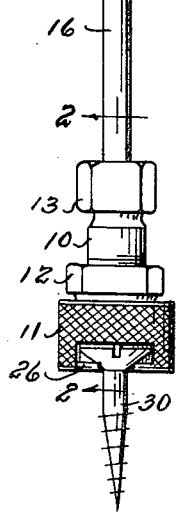
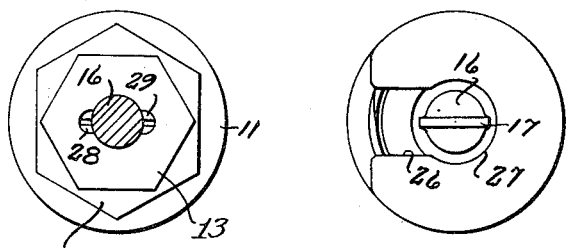
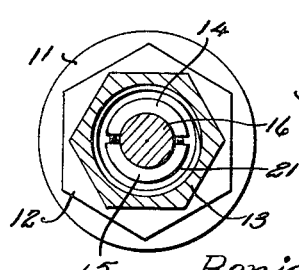
INVENTOR.
Benjamin Ferrara
ATTORNEYS

United States Patent Office 2,709,466
Patented May 31, 1955

2,709,466

SCREW-HOLDING ATTACHMENT FOR SCREW DRIVER

Benjamin Ferrara, East Boston, Mass.

Application May 13, 1952, Serial No. 287,554

1 Claim. (Cl. 145—50)

This invention relates to devices for holding screws on the bits of screwdrivers particularly for starting a screw, and in particular a chuck adapted to be clamped on a bit of a screwdriver with a slot in the lower end for receiving the head of a screw and for positioning the screw in the path of the bit.

The purpose of this invention is to facilitate starting screws into material, particularly where it is difficult to hold a screw with a thumb and finger of one hand as the screw is turned with a screwdriver.

In numerous instances it is difficult to hold a screw as it is being started with a screwdriver and even where a screw is started in a comparatively open area it is sometimes difficult to hold a screw upright as it is being started in the material. With this thought in mind this invention contemplates a screw holding chuck adapted to be positioned on the bit or shank of a screwdriver with means for positioning and holding a screw whereby the screw may readily be started.

The object of the invention is, therefore, to provide means for forming a chuck adapted to be clamped on the bit of a screwdriver whereby a screw may be positioned with a slot in the end thereof adapted to receive the flat bit of the screwdriver.

Another object of the invention is to provide a screw holding chuck that is adapted to be positioned on screwdrivers of conventional designs without changing the design or arrangement of the screwdriver.

A further object of the invention is to provide a screw holding chuck for holding screws in position at the end of a bit of a screwdriver in which the chuck is of a simple and economical construction.

With these and other objects and advantages in view the invention embodies an elongated sleeve having split tapering elements secured by a clamping nut on the upper end for clamping the device to the shank of a screwdriver bit and a chuck having a screw head receiving slot therein carried by a nut threaded on the outer surface of the sleeve.

Other features and advantages of the invention will appear from the following description taken in connection with the drawing, wherein:

Figure 1 is a side elevational view showing the screw holding chuck on the end of a screwdriver bit with a screw positioned in the chuck.

Figure 2 is a vertical section through the screw holding chuck taken in line 2—2 of Fig. 1 also showing the chuck on a screwdriver bit and showing the parts on an enlarged scale.

Figure 3 is a view taken on line 3—3 of Fig. 2 showing a screwdriver bit in section and showing a plan view of the upper end of a screw holding chuck.

Figure 4 is a view looking upwardly toward the under surface of the lower end of the chuck.

Figure 5 is a cross section taken on line 5—5 of Fig. 2 illustrating the tapering clamping elements with which the device is clamped on the shank of a screwdriver bit.

Referring now to the drawing wherein like reference characters denote corresponding parts, the improved screw holding chuck of this invention includes a sleeve 10, a chuck 11, a lock nut 12, a clamping nut 13 and tapering semicylindrical elements 14 and 15 which clamp the device on a shank 16 of a screwdriver bit 17 with the clamping nut 13.

The lower end of the sleeve 10 is provided with an annular flange 18 and the upper end is provided with a section 19 which is of a reduced diameter, the section 19 having threads 20 on the outer surface and having a frustro-conical shape or tapering inner surfaces as indicated by the numeral 21.

The semi-cylindrical elements 14 and 15, which are positioned in the upper end of the sleeve, are provided with tapering outer surfaces to correspond with the surface 21 and these elements are urged into clamping relation with the shank 15 of the screwdriver bit by a flange 22 at the upper end of the clamping nut 13.

The sleeve 10 is provided with a threaded outer surface, as indicated by the numeral 23 and the lock nut 12 is threaded thereon, as shown in Fig. 2. The lock nut 12 is provided with an annular collar 24, the outer surface of which is threaded to receive the upper end of the chuck 11.

The chuck 11 is provided with a threaded bore which extends over the flange 18 of the sleeve 10 and with the upper end of the chuck threaded on the collar 24 of the lock nut 12 a web 25 extended across the lower end is adjustably held in relation to the bit 17.

The web 25 is provided with a slot 26 and the inner end of the slot is provided with an enlarged section 27, the center of which is aligned with the center of the sleeve 10 whereby with the device positioned on the shank of a screwdriver a screw positioned in the opening 27, with the head on the inside, is aligned with a bit of a screwdriver upon which the device is mounted, whereby as the head of the screw is brought into engagement with the end of the bit the bit may be extended into the screwdriver slot in the head of the screw.

With the parts positioned in this manner the device may readily be installed on a bit of a screwdriver with the wide portion forming the bit 17 inserted through notches 28 and 29 in the flange 22 forming the end of the clamping nut 13 and with the device in position the nut 13 is turned to clamp the elements 14 and 15 against the shank of the screwdriver bit.

A screw, as indicated by the numeral 30 may be placed in the slot 26 with the head thereof positioned in the enlarged opening 27. With a screw in position the device is moved upwardly on the shank until the end of the bit is positioned in the screwdriver slot in the head of the screw. With the screw held in this manner it may readily be started into material. After the screw is secured in the material the holder or chuck may be removed whereby the head of the screw may be driven into a countersunk opening or the like.

It will be understood that modifications within the scope of the appended claim may be made in the design and arrangement of the parts without departing from the spirit of the invention.

What is claimed is:

In a screw holder for use on a screwdriver, the combination which comprises a sleeve terminating at one end in an annular flange and at the other end with a reduced portion and having a threaded outer surface on the sleeve and reduced portion and having a frustro-conical shaped bore in the reduced portion, elements having semi-cylindrical surfaces on the inside and semi-conical surfaces on the outside positioned in said frustro-conical shaped bore of the sleeve, a clamping nut threaded on the reduced portion of the sleeve for clamping said elements against a shank of a screwdriver, a lock nut threaded on said sleeve above the said annular flange, and a chuck having a screw receiving slot therein extended through the wall thereof threaded on said lock nut.

References Cited in the file of this patent

UNITED STATES PATENTS

| | | |
|---|---|---|
| 488,691 | Goodell | Dec. 27, 1892 |
| 796,154 | Schulze | Aug. 1, 1905 |
| 1,201,706 | Dodge | Oct. 17, 1916 |
| 1,810,704 | Gentry | June 16, 1931 |

FOREIGN PATENTS

| | | |
|---|---|---|
| 165,733 | Austria | Apr. 11, 1950 |